US010860800B2

(12) United States Patent
Sakai et al.

(10) Patent No.: US 10,860,800 B2
(45) Date of Patent: Dec. 8, 2020

(54) INFORMATION PROCESSING METHOD, INFORMATION PROCESSING APPARATUS, AND PROGRAM FOR SOLVING A SPECIFIC TASK USING A MODEL OF A DIALOGUE SYSTEM

(71) Applicant: Panasonic Intellectual Property Management Co., Ltd., Osaka (JP)

(72) Inventors: Asuka Sakai, Tokyo (JP); Mitsuru Endo, Tokyo (JP); Takashi Ushio, Tokyo (JP); Hongjie Shi, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 43 days.

(21) Appl. No.: 16/133,803

(22) Filed: Sep. 18, 2018

(65) Prior Publication Data

US 2019/0129932 A1    May 2, 2019

Related U.S. Application Data

(60) Provisional application No. 62/578,740, filed on Oct. 30, 2017.

(30) Foreign Application Priority Data

Apr. 27, 2018   (JP) .................................. 2018-087391

(51) Int. Cl.
*G06F 40/295* (2020.01)
*G06N 20/00* (2019.01)

(52) U.S. Cl.
CPC ........... *G06F 40/295* (2020.01); *G06N 20/00* (2019.01)

(58) Field of Classification Search
CPC ............................. G06F 17/278; G06N 20/00
(Continued)

(56) References Cited

U.S. PATENT DOCUMENTS

| 7,702,500 B2 * | 4/2010 | Blaedow | G06F 17/28 704/1 |
| 8,204,736 B2 * | 6/2012 | Emam | G06F 40/20 704/8 |

(Continued)

FOREIGN PATENT DOCUMENTS

| JP | 2002-202795 | 7/2002 |
| JP | 2015-001910 | 1/2015 |

OTHER PUBLICATIONS

Sainbayar Sukhbaatar et al., "End-To-End Memory Networks", Proceedings of NIPS, R, Nov. 24, 2015.

*Primary Examiner* — Edwin S Leland, III
(74) *Attorney, Agent, or Firm* — Greenblum & Bernstein, P.L.C.

(57) ABSTRACT

An information processing method includes acquiring first text information from a storage apparatus in which the first text information representing one or more utterance sentences is stored as a learning data set, identifying one or more named entities included in the acquired first text information, replacing each of the one or more identified named entities with an abstract expression abstracted based on a predetermined rule thereby generating second text information from the first text information, and learning a model of a dialogue system using, as training data, the second text information generated in the replacing.

8 Claims, 11 Drawing Sheets

(58) Field of Classification Search
USPC .............................................................. 704/9
See application file for complete search history.

(56) References Cited

U.S. PATENT DOCUMENTS

| | | | |
|---|---|---|---|
| 2014/0163951 A1* | 6/2014 | Nikoulina | G06F 40/295 |
| | | | 704/4 |
| 2015/0199333 A1* | 7/2015 | Nekhay | G06F 40/30 |
| | | | 704/9 |
| 2016/0180742 A1* | 6/2016 | Lee | G06F 40/253 |
| | | | 704/9 |
| 2016/0350283 A1* | 12/2016 | Carus | G06F 40/30 |
| 2017/0197152 A1* | 7/2017 | Bojja | A63F 13/87 |
| 2017/0351663 A1* | 12/2017 | Sordoni | G06F 17/278 |
| 2019/0129932 A1* | 5/2019 | Sakai | G06N 20/00 |
| 2019/0251165 A1* | 8/2019 | Bachrach | G06N 5/02 |
| 2019/0258461 A1* | 8/2019 | Li | G06F 40/211 |
| 2020/0184017 A1* | 6/2020 | Batra | G06F 40/30 |

\* cited by examiner

FIG. 3

| candidate | slot | value |
|---|---|---|
| the_sparkling_service | r_location | paris |
| the_sparkling_service | r_price | cheap |
| the_sparkling_service | r_rating | 40 |
| the_sparkling_service | r_cuisine | british |
| the_sparkling_service | r_atmosphere | business |
| the_sparkling_service | r_number | two |
| gentle_deep_water | r_location | paris |
| gentle_deep_water | r_price | cheap |
| gentle_deep_water | r_rating | 32 |
| gentle_deep_water | r_cuisine | british |
| gentle_deep_water | r_atmosphere | business |
| gentle_deep_water | r_number | two |

FIG. 4

| source | destination |
|---|---|
| french | cusine_1 |
| british | cusine_2 |
| the_sparkling_service | cand_1 |
| gentle_deep_water | cand_2 |

FIG. 5

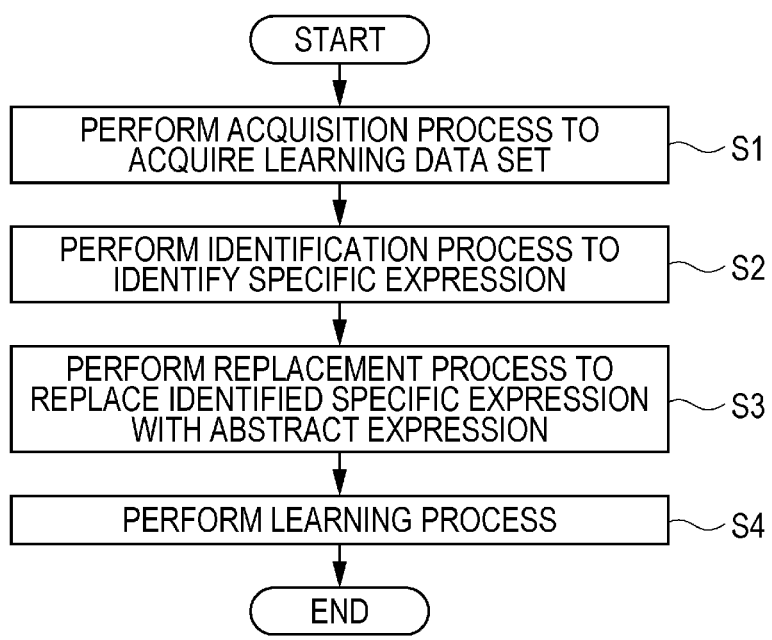

U: Hi !
S: Hello, what can I help you with today?
U: Can you make a restaurant reservation with a business atmosphere in a cheap price in paris
S: Any preference on a type of cuisine
U: I like french cuisine better than british
S: api_call paris french cheep business

| source | destination |
|---|---|
| business | atmosphere_1 |
| cheap | price_1 |
| paris | location_1 |
| french | cuisine_1 |
| british | cuisine_2 |

FIG. 9

U: Hi !
S: Hello, what can I help you with today?
U: Can you make a restaurant reservation with a atmosphere_1 atmosphere in a price_1 price in location_1
S: Any preference on a type of cuisine
U: I like cuisine_1 cuisine better than cuisine_2
S: api_call location_1 cusine_1 price_1 atmosphere_1

FIG. 10

U: Hi !
S: Hello, what can I help you with today?
U: Can you make a hotel reservation for a vacation for two people in london?
S: Which price range are you looking for?
U: Expensive is tempting, but cheap may be more reasonable.
S: api_call london cheap two vacation

FIG. 11

| source | destination |
|---|---|
| vacation | atmosphere_1 |
| two | number_1 |
| london | location_1 |
| expensive | price_1 |
| cheap | price_2 |

FIG. 12

U: Hi !
S: Hello, what can I help you with today?
U: Can you make a hotel reservation for a atmosphere_1 for number_1 people in location_1?
S: Which price range are you looking for?
U: price_1 is tempting, but price_2 may be more reasonable.
S: api_call location_1 price_2 number_1 atmosophere_1

FIG. 13

U: Hi !
S: Hello, what can I help you with today?
U: Can I order burger with chicken with mustard sauce with onion?
S: Which buns do you like?
U: I like wheat bun, but my friend recommends cheese bun.
S: api_call chicken onion mustard cheese

FIG. 14

| source | destination |
|---|---|
| chicken | main_1 |
| onion | vagetable_1 |
| mustard | sauce_1 |
| wheat | bun_1 |
| cheese | bun_2 |

FIG. 15

U: Hi !
S: Hello, what can I help you with today?
U: Can you order burger with main_1 with sauce_1 sauce with vegetable_1?
S: How is bun?
U: I like bun_1 bun, but my friend recommend bun_2 bun.
S: api_call main_1 vegetable_1 sauce_1 bun_2

FIG. 16

U: Hi !
S: Hello, what can I help you with today?
U: Can you tell me house with three bedrooms with new age in a cheap fee
S: Where should it be?
U: I like setagaya place better than shinjuku
S: api_call setagaya new cheep three

FIG. 17

| source | destination |
|---|---|
| three | number_1 |
| new | age_1 |
| cheap | price_1 |
| setagaya | location_1 |
| shinjuku | location_2 |

FIG. 18

U: Hi !
S: Hello, what can I help you with today?
U: Can you tell me house with number_1 bedrooms with age_1 age in a price_1 fee
S: Where should it be?
U: I like location_1 place better than location_2
S: api_call location_1 age_1 price_1 number_1

FIG. 19

U: Hi !
S: Hello, what can I help you with today?
U: Can you book a table with a business atmosphere in a cheap price with british in paris for two people?
S: I 'm on it. Let me look into some options for you
   What do you think of this option: the_sparkling_service
U: Do you have something else?
S: What do you think of this option: gentle_deep_water
U: It 's perfect

FIG. 20

- the_sparkling_service r_location paris
- the_sparkling_service r_price cheap
- the_sparkling_service r_rating 40
- the_sparkling_service r_cuisine british
- the_sparkling_service r_atmosphere business
- the_sparkling_service r_number two

- gentle_deep_water r_location paris
- gentle_deep_water r_price cheap
- gentle_deep_water r_rating 32
- gentle_deep_water r_cuisine british
- gentle_deep_water r_atmosphere business
- gentle_deep_water r_number two

FIG. 21

| source | destination |
|---|---|
| the_sparkling_service | cand_1 |
| gentle_deep_water | cand_2 |

FIG. 22

U: Hi !
S: Hello, what can I help you with today?
U: Can you book a table with a business atmosphere in a cheap price with british in paris for two people?
S:I lm on it.Let me look into some options for you
   What do you think of this option: cand_1
U: Do you have something else?
S: What do you think of this option: cand_2
U:It ls perfect

FIG. 23

U: Hi !
S: Hello, what can I help you with today?
U: Can you make a hotel reservation for a vacation for two people in London in a cheap price?
S:I lm on it.Let me look into some options for you
   What do you think of this option: green_dog_garden
U: Do you have something else?
S: What do you think of this option: deep_wolf_hill
U:It ls perfect

FIG. 24

- green_dog_garden r_location london
- green_dog_garden r_price cheap
- green_dog_garden r_rating 55
- green_dog_garden r_phone green_dog_garden_phone
- green_dog_garden r_atmosphere vacation
- green_dog_garden r_number two

- deep_wolf_hill r_location paris
- deep_wolf_hill r_price cheap
- deep_wolf_hill r_rating 34
- deep_wolf_hill r_phone deep_wolf_hill_phone
- deep_wolf_hill r_atmosphere business
- deep_wolf_hill r_number two

FIG. 25

| source | destination |
|---|---|
| green_dog_garden<br>deep_wolf_hill | cand_1<br>cand_2 |

FIG. 26

U: Hi !
S: Hello, what can I help you with today?
U: Can you make a hotel reservation for a vacation for two people in London in a cheap price?
S: I'm on it. Let me look into some options for you
   What do you think of this option: cand_1
U: Do you have something else?
S: What do you think of this option: cand_2
U: It's perfect

FIG. 27

U: Hi !
S: Hello, what can I help you with today?
U: Can you tell me house with three bedrooms with new age in a cheap fee in setagaya?
S: I'm on it. Let me look into some options for you
   What do you think of this option: grand_union_forest ?
U: Do you have something else?
S: What do you think of this option: water_colorful_tree ?
U: It's perfect

FIG. 28

- grand_union_forest r_location setagaya
- grand_union_forest r_price cheap
- grand_union_forest r_distance 0.8
- grand_union_forest r_age new
- grand_union_forest r_address grand_union_forest_address
- grand_union_forest r_number three

- water_colorful_tree r_location setagaya
- water_colorful_tree r_price cheap
- water_colorful_tree r_distance 1.2
- water_colorful_tree r_age new
- water_colorful_tree r_address water_colorful_tree address
- water_colorful_tree r_number three

FIG. 29

| source | destination |
|---|---|
| grand_union_forest | cand_1 |
| water_colorful_tree | cand_2 |

FIG. 30

```
U: Hi !
S: Hello, what can I help you with today?
U: Can you tell me house with three bedrooms
with new age in a cheap fee in setagaya?
S: I'm on it. Let me look into some options for you
   What do you think of this option: cand_1 ?
U: Do you have something else?
S: What do you think of this option: cand_2 ?
U: It's perfect
```

FIG. 31

|  | Test #1 | Test #2 |
|---|---|---|
| Original | 0.871 | 0.643 |
| + replacement | 0.968 | 0.964 |
| + replacement, bi-gram, removing candidate | 0.998 | 0.997 |

FIG. 32

|  | Test #1 | Test #2 |
|---|---|---|
| Original | 0.595 | 0.601 |
| + replacement | 0.941 | 0.957 |
| + replacement, normalize | 0.991 | 0.993 |

FIG. 33

|  | Test #1 | Test #2 |
|---|---|---|
| Original | 0.529 | 0.566 |
| + replacement | 0.984 | 0.986 |
| + replacement, normalize | 0.995 | 0.997 |

INFORMATION PROCESSING METHOD, INFORMATION PROCESSING APPARATUS, AND PROGRAM FOR SOLVING A SPECIFIC TASK USING A MODEL OF A DIALOGUE SYSTEM

BACKGROUND

1. Technical Field

The present disclosure relates to an information processing method, an information processing apparatus, and a program, applied to a dialogue system.

2. Description of the Related Art

A dialogue system is a system that executes, using a dialogue robot or the like, a task depending on an utterance by a user. There are two types of dialogue systems: a task-oriented dialogue system that has a dialogue with a user to achieve a specific task such as a restaurant search task; and a non-task-oriented dialogue system that has a dialogue with a user about unspecified various subjects.

The dialogue system needs to be capable of accurately understanding a content of an utterance made by a user and properly responding to the utterance. To achieve this requirement, it is known to generate a model of the dialogue system by performing learning such as machine learning or the like (see, for example, Japanese Unexamined Patent Application Publication No. 2015-1910).

In a technique disclosed in Japanese Unexamined Patent Application Publication No. 2015-1910, learning is performed to make it possible to accurately determine a type of a dialogue action even for an utterance including various informal expressions.

SUMMARY

Utterance sentences used as training data can include a named entity such as a proper noun or the like, which makes it difficult to generate an accurate model of a dialogue system. In the technique disclosed in Japanese Unexamined Patent Application Publication No. 2015-1910, any particular consideration is taken on learning an utterance sentence including a named entity.

In one general aspect, the techniques disclosed here feature an information processing method including acquiring first text information from a storage apparatus in which the first text information representing one or more utterance sentences is stored as a learning data set, identifying one or more named entities included in the acquired first text information, replacing each of the one or more identified named entities with an abstract expression abstracted based on a predetermined rule thereby generating second text information from the first text information, and learning a model of a dialogue system using, as training data, the second text information generated in the replacing.

The information processing method and the related techniques according to the present disclosure makes it possible to achieve an improvement in accuracy of the model of the dialogue system generated via learning.

These general and specific aspects may be implemented using a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating an example of knowledge stored in a knowledge base shown in FIG. 2;

FIG. 4 is a diagram illustrating examples of expression pairs stored in a context dictionary shown in FIG. 2;

FIG. 5 is flow chart illustrating an outline of an operation of an information processing apparatus according to an embodiment;

FIG. 9 is a diagram illustrating an example of one dialogue which has been subjected to the replacement process according to the first embodiment;

FIG. 10 is a diagram illustrating an example of one dialogue which is not yet subjected to a replacement process according to a second embodiment;

FIG. 11 is a diagram illustrating an example of a context dictionary according to the second embodiment;

FIG. 12 is a diagram illustrating an example of one dialogue which has been subjected to the replacement process according to the second embodiment;

FIG. 13 is a diagram illustrating an example of one dialogue which is not yet subjected to a replacement process according to a third embodiment;

FIG. 14 is a diagram illustrating an example of a context dictionary according to the third embodiment;

FIG. 15 is a diagram illustrating an example of one dialogue which has been subjected to the replacement process according to the third embodiment;

FIG. 16 is a diagram illustrating an example of one dialogue which is not yet subjected to a replacement process according to a fourth embodiment;

FIG. 17 is a diagram illustrating an example of a context dictionary according to the fourth embodiment;

FIG. 18 is a diagram illustrating an example of one dialogue which has been subjected to the replacement process according to the fourth embodiment;

FIG. 19 is a diagram illustrating an example of one dialogue which is not yet subjected to a replacement process according to a fifth embodiment;

FIG. 20 is a diagram illustrating a part of a knowledge base according to the fifth embodiment;

FIG. 21 is a diagram illustrating an example of a context dictionary according to the fifth embodiment;

FIG. 22 is a diagram illustrating an example of one dialogue which has been subjected to the replacement process according to the fifth embodiment;

FIG. 23 is a diagram illustrating an example of one dialogue which is not yet subjected to a replacement process according to a sixth embodiment;

FIG. 24 is a diagram illustrating a part of a knowledge base according to the sixth embodiment;

FIG. 25 is a diagram illustrating an example of a context dictionary according to the sixth embodiment;

FIG. 26 is a diagram illustrating an example of one dialogue which has been subjected to the replacement process according to the sixth embodiment;

FIG. 27 is a diagram illustrating an example of one dialogue which is not yet subjected to a replacement process according to a seventh embodiment;

FIG. 28 is a diagram illustrating a part of a knowledge base according to the seventh embodiment;

FIG. 29 is a diagram illustrating an example of a context dictionary according to the seventh embodiment;

FIG. 30 is a diagram illustrating an example of one dialogue which has been subjected to the replacement process according to the seventh embodiment;

FIG. 31 is a diagram illustrating an effect of a replacement process according to an embodiment of the present disclosure;

FIG. 32 is a diagram illustrating an effect of a replacement process according to an embodiment of the present disclosure; and FIG. 33 is a diagram illustrating an effect of a replacement process according to an embodiment of the present disclosure.

DETAILED DESCRIPTION

Figure 1:
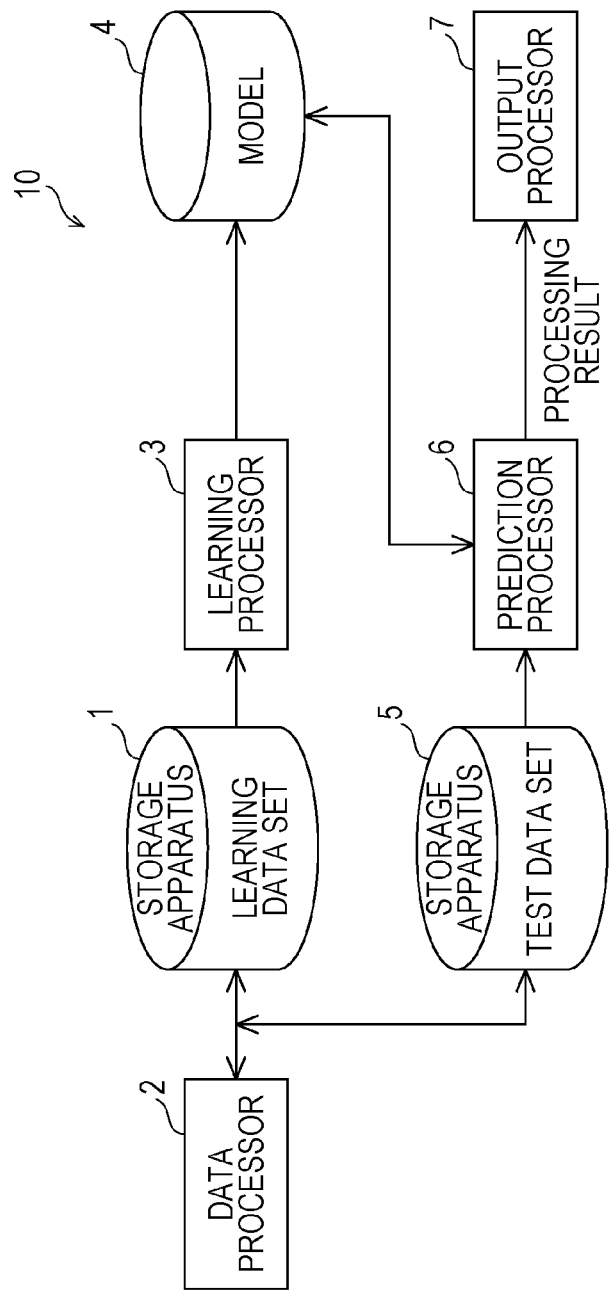
FIG. 1 is a block diagram illustrating an example of a configuration of an information processing apparatus according to an embodiment.

In an aspect of the present disclosure, there is provided an information processing method including acquiring first text information from a storage apparatus in which the first text information representing one or more utterance sentences is stored as a learning data set, identifying one or more named entities included in the acquired first text information, replacing each of the one or more identified named entities with an abstract expression abstracted based on a predetermined rule thereby generating second text information from the first text information, and learning a model of a dialogue system using, as training data, the second text information generated in the replacing.

According to the present aspect, it is possible to learn the model of the dialogue system using training data obtained by replacing named entities included in utterance sentences with abstract expressions in which variations of named entities are eliminated based on the predetermined rule. Thus, an improvement in the accuracy of the model of the dialogue system generated by the learning is achieved.

For example, in the replacement process, in addition to replacing each of the one or more identified named entities with the abstract expression abstracted based on the predetermined rule, a numeral value may be added depending on a context in one or more utterance sentences represented in the first text information thereby generating the second text information from the first text information.

For example, the numeral value depending on the context may be a numeral value depending on the order in which the one or more named entities occur in the one or more utterance sentences represented in the first text information.

In these aspects, as a result of adding a numeral value, depending on a context, to each abstract expression obtained by the replacement according to the predetermined rule, it becomes possible to provide training data in which different entities of abstract expressions belong to the same concept are distinguished from each other in one dialogue, while they are regarded identical to each other between different dialogues. This makes it possible to achieve a further improvement in the accuracy of the model of the dialogue system generated by the learning.

For example, in the replacement process, a named entity, which is included in the one or more identified named entities and which is of a facility name indicating a target candidate that may give a solution of the specific task, may be replaced with an abstract expression abstracted based on the predetermined rule, and a numeral value corresponding to a rank based on an evaluation value about a service provided by a facility indicated by the facility name may be added as the numeral value depending on the context.

For example, the information processing method may further include performing a process to solve a specific task using the model learned in the learning, wherein in the acquiring, the third text information may be acquired from a storage apparatus in which the third text information representing one or more utterance sentences is stored as a test data set, in the identifying, one or more named entities included in the acquired third text information may be identified, in the replacing, each of the one or more identified named entities included in the third text information may be replaced with an abstract expression abstracted based on the predetermined rule thereby generating fourth text information from the third text information, and in the performing the process, the process to solve the specific task may be performed using, as a test data set, the fourth text information generated in the replacing.

According to the present aspect, it is possible to use the test data set obtained by replacing named entities included in utterance sentences with abstract expressions in which variations of named entities are eliminated based on the predetermined rule. This makes it possible for the model of the dialogue system generated by the learning to perform a process to accurately estimate a dialogue action or a dialogue state of an utterance, and accurately estimate or output a response content that is to be performed by the dialogue system in response to an utterance of a user.

For example, the information processing method may further include performing preprocessing in which a bigram process is performed as the prepressing to divide the second text information and the fourth text information generated in the replacing into a plurality of segments each including two adjacent expressions, wherein in the learning, the model may be learned using, as training data, the second text information subjected to the bigram process in the preprocessing, and in the performing the process, a further process may be performed to solve the specific task using, as a test data set, the fourth text information subjected to the bigram process in the preprocessing.

For example, the information processing method may further include performing preprocessing in which a standardization process is performed as the prepressing to standardize a format of the expressions included in the second text information and the fourth text information generated in the replacing, wherein in the learning, the model may be learned using, as training data, the second text information subjected to the standardization process in the preprocessing, and in the performing the process, a further process may be performed to solve the specific task using, as a test data set, the fourth text information subjected to the standardization process in the preprocessing.

For example, the information processing method may further include performing outputting such that one or more abstract expressions, included in a result of the performed process to solve the specific task and replaced based on the predetermined rule, are replaced with the original named entities and output.

In an aspect, the present disclosure provides an information processing apparatus including an acquirer that acquires first text information from a storage apparatus in which first text information representing one or more utterance sentences is stored as a learning data set, an identifier that identifies one or more named entities included in the acquired first text information, a replacement processor that replaces each of the one or more named entities identified by the identifier with an abstract expression abstracted based on a predetermined rule thereby generating second text information from the first text information, and a learning processor that learns a model of a dialogue system using, as training data, the second text information generated by the replacement processor.

In an aspect, the present disclosure provides a program that causes a computer to execute the information processing method according to the above-described aspect.

It should be noted that general or specific embodiments may be implemented as a system, a method, an integrated circuit, a computer program, a computer-readable storage medium such as CD-ROM, or any selective combination thereof.

Embodiments of the present disclosure are described below with reference to drawings. Note that each embodiment described below is for illustrating a specific example of the present disclosure. That is, in the following embodiments of the present disclosure, values, shapes, constituent elements, steps, the order of steps, and the like are described by way of example but not limitation. Among constituent elements described in the following embodiments, those constituent elements that are not described in independent claims indicating highest-level concepts of the present disclosure are optional. Also note that various combinations of part or all of embodiments are possible.

EMBODIMENTS

Embodiments of an information processing method and related techniques are described below with reference to drawings.

Information Processing Apparatus 10

Figure 2:
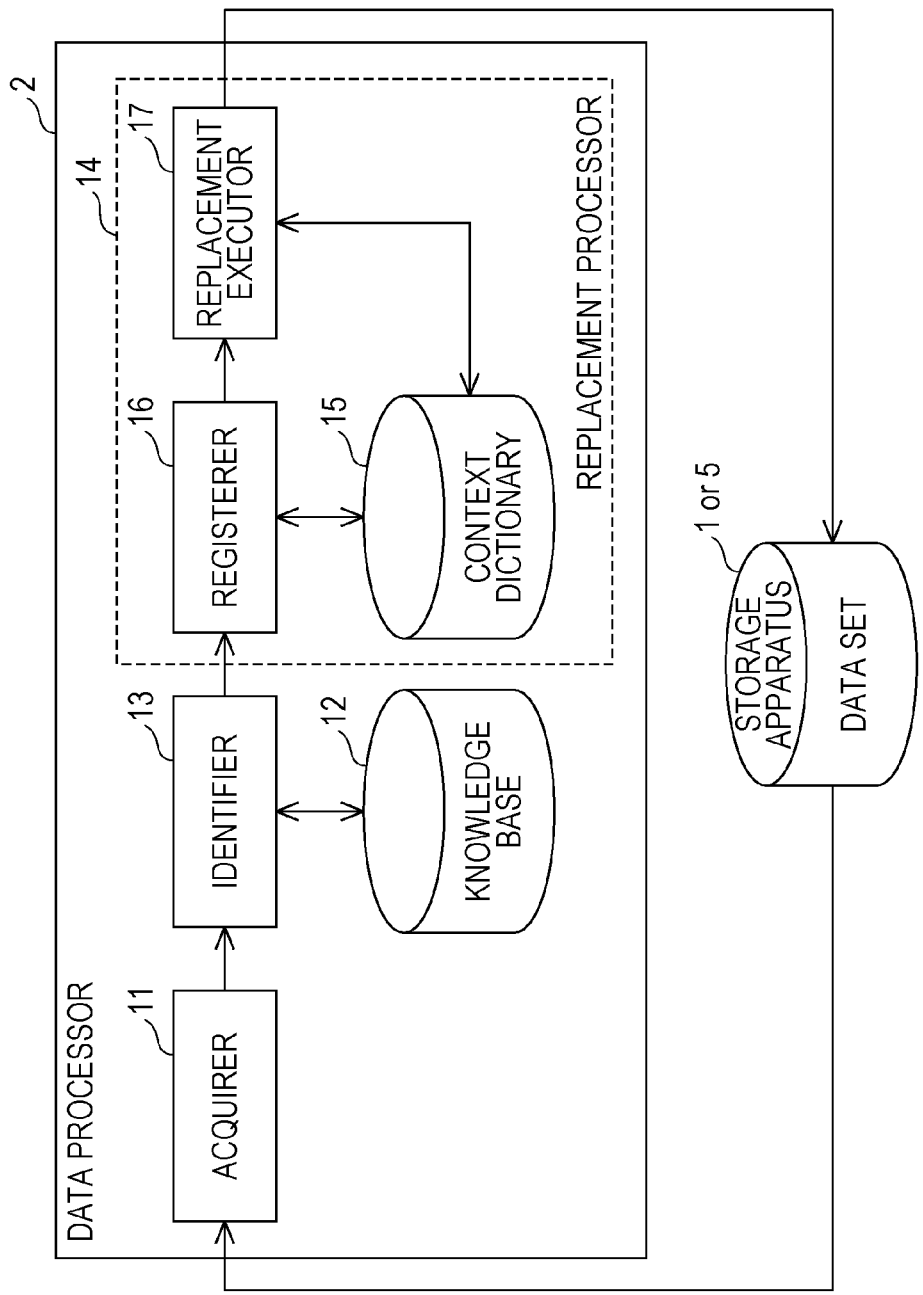
FIG. 2 is a block diagram illustrating an example of a detailed configuration of a data processor shown in FIG. 1.

FIG. 1 is a block diagram illustrating an example of a configuration of the information processing apparatus 10 according to an embodiment. FIG. 2 is a block diagram illustrating an example of a detailed configuration of a data processor 2 shown in FIG. 1.

The information processing apparatus 10 includes, as shown in FIG. 1, storage apparatuses 1, 4, and 5, a learning processor 3, a prediction processor 6, and an output processor 7, and is used in a dialogue system. This dialogue system may be a task-oriented dialogue system.

Storage Apparatus 1, 4, and 5

The storage apparatus 1 stores a learning data set used in a learning process by the learning processor 3. In the present embodiment, the storage apparatus 1 stores first text information representing one or more utterance sentences as the learning data set used by the learning processor 3 when the learning processor 3 performs the learning process. The learning data set includes a plurality of pieces of dialogue data each including one or more utterance sentences.

The storage apparatus 4 stores a model to be learned by the learning processor 3 using the learning data set. In the present embodiment, the storage apparatus 4 stores a dialogue system model to be learned by the learning processor 3.

The storage apparatus 5 stores a test data set used in a prediction process by the prediction processor 6. In the present embodiment, the storage apparatus 4 stores third text information representing one or more utterance sentences as the test data set, which is used by the prediction processor 6 when the prediction processor 6 performs the prediction process. The test data set includes a plurality of pieces of dialogue data each including one or more utterance sentences.

The storage apparatuses 1, 4, and 5 each are realized using a rewritable nonvolatile memory such as a hard disk drive, a solid state drive, or the like.

Data Processor 2

The data processor 2 processes the learning data set stored in the storage apparatus 1. In the present embodiment, the data processor 2 generates second text information from the first text information by replacing one or more named entities included in the first text information with abstract expressions abstracted based on a predetermined rule. Note that the named entity is a generic expression of proper nouns such as person names, location names, and the like, date expressions, time expressions, and the like. More specifically, examples of named entities are organization names, person names, location names, date expressions, time expressions, money amount expressions, rate expressions, artifact names, and the like. Note that in the present embodiment, the abstract expressions are generalized concepts of named entities such that different entities of abstract expressions belong to the same concept are distinguish from each other in one dialogue, while they are regarded identical to each other between different dialogues.

The data processor 2 processes the test data set stored in the storage apparatus 5. In the present embodiment, the data processor 2 generates fourth text information from the third text information by replacing one or more named entities included in the third text information with abstract expressions abstracted based on a predetermined rule.

The data processor 2 may perform a standardization process on the generated second text information and fourth text information to standardize the formats of expressions included therein. The standardization process is, for example, a process of converting a plural form of a word to a singular form, a process of converting a past form of a word to a present form, or the like. The data processor 2 may preform a bigram process on the generated second text information and fourth text information to divide the text information in units of adjacent two expressions.

A detailed configuration and related matters will be described later.

Learning Processor 3

The learning processor 3 is realized by a computer or the like and performs a learning process of a model of the dialogue system based on a predetermined algorithm used in machine learning such as deep learning or the like. The learning processor 3 performs the learning process using the learning data set processed by the data processor 2 and stored in the storage apparatus 1. The learning processor 3 stores the model subjected to the learning process in the storage apparatus 4.

In the present embodiment, the learning processor 3 learns the model of the dialogue system using, as training data, the second text information generated by the data processor 2. The model of the dialogue system may be a neural network model to be subjected to machine learning and may include, for example, a recurrent neural network.

In a case where the second text information is subjected to the bigram process in the data processor 2, the learning processor 3 may learn the model of the dialogue system using, as training data, the second text information subjected to the bigram process. In a case where the second text information is subjected to the standardization process in the data processor 2, the learning processor 3 may learn the model of the dialogue system using, as training data, the second text information subjected to the standardization process.

Prediction Processor 6

The prediction processor 6 is realized by a computer or the like. The prediction processor 6 makes the learned model stored in the storage apparatus 4 perform a process to solve a specific task using a test data set. More specifically, the prediction processor 6 performs this process using the test data set processed by the data processor 2 and stored in the storage apparatus 5. The prediction processor 6 outputs a processing result to the output processor 7. The specific task is, for example, a restaurant reservation task, a hotel reservation task, a burger order task, or a rent apartment search task. However, the specific task is not limited to these examples. The process of solving the specific task is estimating a dialogue action or a dialogue state of an utterance made by a user to solve a specific task, estimating and outputting a content of a response to be made by the system in response to the utterance made by the user, or the like. However, the process of solving the specific task is not limited to these examples.

In the present embodiment, the prediction processor 6 performs the process to solve the specific task using the model subjected to the learning in the learning processor 3. More specifically, the prediction processor 6 performs the process to solve the specific task using, as the test data, the fourth text information generated by the data processor 2. The prediction processor 6 then outputs a processing result to the output processor 7.

In a case where the fourth text information is subjected to the bigram process in the data processor 2, the prediction processor 6 may perform the process to solve the specific task using, as the test data, the fourth text information subjected to the bigram process. In a case where the fourth text information is subjected to the standardization process in the data processor 2, the prediction processor 6 may perform the process to solve the specific task using, as the test data, the fourth text information subjected to the standardization process.

Output Processor 7

The output processor 7 performs an inverse conversion on the output result acquired from the prediction processor 6 to convert an abstract expression included in the output result to an original named entity and outputs a conversion result. In the present embodiment, the output processor 7 performs the inverse conversion such that one or more abstract expressions, which have been obtained via the replacement based on the predetermined rule and which are included in the result of the process to solve the specific task, are replaced with the original named entities, and the output processor 7 outputs the result.

Details of the configuration of the data processor 2 are described below.

Data Processor 2

The data processor 2 includes, for example, an acquirer 11, a knowledge base 12, an identifier 13, and a replacement processor 14, as shown in FIG. 2. The data processor 2 may further include a preprocessor (not shown in the figure) at a stage following the replacement processor 14.

Acquirer 11

The acquirer 11 acquires the first text information from the storage apparatus 1 in which the first text information representing one or more utterance sentences is stored as the learning data set. In the present embodiment, the acquirer 11 acquires the learning data set as the first text information from the storage apparatus 1 and outputs the acquired learning data set to the identifier 13. The acquirer 11 may acquire, as the first text information, one dialogue at a time from the learning data set, that is, text information representing one dialogue or may acquire one utterance at a time from one or more utterances included in the one dialogue, that is, text information representing one utterance.

The acquirer 11 also acquires the third text information from the storage apparatus 5 in which the third text information representing one or more utterance sentences is stored as the test data set. In the present embodiment, the acquirer 11 acquires the test data set as the third text information from the storage apparatus 5 and outputs the acquired test data set to the identifier 13. The acquirer 11 may acquire, as the third text information, one dialogue at a time from the test data set, that is, text information representing one dialogue, or may acquire one utterance at a time from one or more utterances included in the one dialogue, that is, text information representing one utterance.

The acquirer 11 includes a processor such as a CPU, an ASIC, an FPGA or the like and is realized by the processor such as the CPU or the like by executing a computer-readable program stored in the computer.

Knowledge Base 12

The knowledge base 12 is a database in which knowledge about facts, common senses, and/or experiences is described in a form interpretable by a computer. The knowledge base 12 allows it to acquire knowledge by performing searching. Note that the knowledge base 12 may exist outside the data processor 2. That is, the data processor 2 does not necessarily need to include knowledge base 12.

FIG. 3 is a diagram illustrating an example of knowledge stored in the knowledge base 12 shown in FIG. 2. In the example shown in FIG. 3, information about restaurants is stored in the knowledge base 12 according to the present embodiment. More specifically, in the example shown in FIG. 3, two restaurant names "the_sparkling_service" and "gentle_deep_water" are shown as restaurant candidates. That is, in FIG. 3, facility names representing target candidates, which may solve the specific task, are indicated as examples of candidates. In FIG. 3, contents (values) of restaurants and their attributes (slots) are also indicated, that is, "pari" and "r_location", "cheap" and "r_price", "40" and "r_rating", "british" and "r_cuisine", "business" and "r_atmosphere", and "two" and "r_number" are shown. That is, in FIG. 3, contents (values) of restaurants and their attributes (slots), which are generalized concepts of the contents, are shown. In other words, abstract expressions are expressions obtained by abstracting one or more named entities according to the predetermined rule.

Identifier 13

The identifier 13 identifies one or more named entities included in the first text information acquired by the acquirer 11. In the present embodiment, the identifier 13 refers to the knowledge base 12 to identify one or more named entities that are included in the first text information acquired by the acquirer 11 and that are to be subjected to the replacement process.

The identifier 13 also identifies one or more named entities included in the third text information acquired by the acquirer 11. In the present embodiment, the identifier 13 refers to the knowledge base 12 to identify one or more named entities that are included in the third text information acquired by the acquirer 11 and that are to be subjected to the replacement process.

Replacement Processor 14

The replacement processor 14 generates second text information from the first text information by replacing one or more named entities identified by the identifier 13 with abstract expressions abstracted based on the predetermined rule.

In the present embodiment, the replacement processor 14 includes, as shown in FIG. 2, a context dictionary 15, a registerer 16, and a replacement executer 17. Note that the replacement processor 14 may not include the context dictionary 15 and the registerer 16.

Context Dictionary 15

The context dictionary 15 stores pairs of expressions between which the replacement is performed depending on the context. Using the context dictionary 15, it is possible to find knowledge. That is, in the context dictionary 15, named entities and corresponding abstract expressions to which the named entities are replaced are stored.

FIG. 4 illustrates by way of example expression pairs stored in the context dictionary 15 shown in FIG. 2. In the example shown in FIG. 4, one or more named entities included in the first text information or the third text information and their abstract expressions paired with the respective named entities are stored in the context dictionary 15 according to the present embodiment. More specifically, in the example shown in FIG. 4, "french", "british", "the_sparkling_service", and "gentle_deep_water" are stored in a replacement source field. That is, as shown in FIG. 4, words or strings of words existing in the content field (value field) or the candidate field of the knowledge base 12 are registered in the replacement source field of the context dictionary 15.

Furthermore, in the example shown in FIG. 4, "cuisine_1", "cuisine_2", "cand_1", and "cand_2" are stored in the replacement destination field. That is, as shown in FIG. 4, words or strings of words which exist in an attributed field (a slot field) of the knowledge base 12 and each of which has a numeral suffix added thereto depending on a context are registered in the replacement destination field of the context dictionary 15. The numeral values at the suffix have serial values assigned in the order in which the expressions occur in the value field. In other words, each numeral value has a value assigned in the order in which the one or more named entities occur in the one or more utterance sentences represented in the first text information (or the third text information).

In a case where expressions in the replacement source field are words or strings of words existing in the candidate field, numeral values corresponding to ranks of evaluation values on the service provided by the facilities represented by the expression are added as the numeral values depending on the context. The evaluation values are values indicating evaluations about services, such as cuisines, feelings, prices of cuisines, provided by the facilities. The evaluation values may be determined based on reputations, the number of comments, ranking, the number of accesses, on the Internet or the like, or evaluation values may be determined such that rows including "r_rating" are extracted from the knowledge base 12 and the evaluation value may be determined depending on the number of rows. In the example shown in FIG. 3, the content (value) of the attribute (slot) of "r_rating" is "40" for "the_sparkling_service", while the content (value) of the attribute (slot) of "r_rating" is "32" for "gentle_deep_water". Thus, "the_sparkling_service" has a higher evaluation value than "gentle_deep_water", and thus they are respectively assigned numbers 1 and 2. That is, "the_sparkling_service" and "gentle_deep_water" in the replacement source field may be assigned "cand_1" and "cand_2" in the replacement destination field.

Note that the context dictionary 15 is not limited to the example shown in FIG. 4. For example, the numbering may not be performed, or expressions of words or strings of words existing in the candidate field shown in FIG. 3 may not included in the replacement source field. That is, only expressions existing in the context field (value field) of the knowledge base 12 may be registered in the replacement source field. In this case, expressions existing in the attributed field (slot field) of the knowledge base 12 may be registered in the replacement destination field, or expressions existing in the attributed field (slot field) of the knowledge base 12 are added with numeral values depending on the context, and results may be registered in the replacement destination field.

Registerer 16

The registerer 16 includes a processor such as a CPU, an ASIC, an FPGA or the like and is realized by the processor such as the CPU or the like by executing a computer-readable program stored in the computer.

In the present embodiment, the registerer 16 checks whether the named entities, which are identified by the identifier 13 and which are to be subjected to the replacement process, are registered in the replacement source field and corresponding expressions are registered in the replacement destination field of the context dictionary 15. In other words, the registerer 16 checks whether each of one or more named entities included in the first text information (or third text information) is registered in the context dictionary 15.

In a case where the registerer 16 determines that the one or more named entities included in the first text information (or the third text information) include a named entity that is not registered in the context dictionary 15, the registerer 16 registers these unregistered named entities together with corresponding expressions depending on the context in the context dictionary 15.

Replacement Executer 17

The replacement executer 17 includes a processor such as a CPU, an ASIC, an FPGA or the like and is realized by the processor such as the CPU or the like by executing a computer-readable program stored in the computer.

In the present embodiment, the replacement executer 17 performs a replacement process such that each of the one or more named entities identified by the identifier 13 is replaced according to the context dictionary 15. More specifically, the replacement executer 17 replaces each of the one or more named entities identified by the identifier 13 with an abstract expression abstracted based on the predetermined rule, and adds a numeral value depending on the context in the one or more utterance sentences represented in the first text information thereby generating second text information from the first text information. Note that the numeral values depending on the context are assigned in the order in which the one or more named entities occur in the one or more utterance sentences represented in the first text information. Furthermore, the replacement executer 17 performs a replacement process such that, of the one or more named entities identified by the identifier 13, facility names indicating target candidates that may give a solution of the specific task are replaced with abstract expressions abstracted based on the predetermined rule, and numeral values depending on evaluation values about the service provided by facilities indicated by the facility names are added as the numeral values depending on the context. The replacement executer 17 outputs the generated second text information to the storage apparatus 1.

In some cases, only expressions existing in the context field (value field) of the knowledge base 12 are registered in the replacement source field of the context dictionary 15, while only expressions existing in the attributed field (slot field) of the knowledge base 12 are registered in the replacement destination field. In this case, the replacement executer 17 may generate second text information from the first text information by replacing one or more named entities identified by the identifier 13 with abstract expressions abstracted based on a predetermined rule. In some case, expressions existing in the attributed field (slot field) of the knowledge base 12 are added with numeral values depending on the context and results are registered in the replacement destination field of the context dictionary 15. In this case, the replacement executer 17 may replaces each of the one or more named entities identified by the identifier 13 with abstract expression according to the context dictionary 15 and further adds a numeral value depending on the context in one or more utterance sentences represented in the first text information thereby generating the second text information from the first text information.

The replacement process performed by the replacement executer 17 is not limited to that in which one or more named entity included in the first text information are respectively replaced with abstract expressions. The replacement executer 17 may perform the replacement process such that one or more named entity included in the third text information are respectively replaced with abstract expressions. For example, only expressions existing in the context field (value field) of the knowledge base 12 may be registered in the replacement source field of the context dictionary 15, and only expressions existing in the attributed field (slot field) of the knowledge base 12 may be registered in the replacement destination field. In this case, similarly, the replacement executer 17 may generate fourth text information from the third text information by replacing one or more named entities identified by the identifier 13 with abstract expressions abstracted based on a predetermined rule. The replacement executer 17 outputs the generated fourth text information to the storage apparatus 5. Note that the replacement executer 17 performs an operation similarly also in the process of adding numeral values depending on the context of the content of the context dictionary 15, and in the process of generating the fourth text information from the third text information.

Preprocessor

The preprocessor may perform a standardization process on the second text information and/or the fourth text information generated by the replacement processor 14 to standardize formats of the expressions included therein. The preprocessor may perform a bigram process on the second text information and/or the fourth text information generated by the replacement processor 14 to divide the second text information and/or the fourth text information into a plurality of segments each including two adjacent expressions.

The preprocessor includes a processor such as a CPU, an ASIC, an FPGA or the like and is realized by the processor such as the CPU or the like by executing a computer-readable program stored in the computer.

Operation of Information Processing Apparatus 10

Next, information processing performed by the information processing apparatus 10 configured in the above-described manner is described.

FIG. 5 is flow chart illustrating an outline of the operation of the information processing apparatus 10 according to an embodiment.

First, the information processing apparatus 10 performs an acquisition process to acquire a learning data set (S1). More specifically, the information processing apparatus 10 acquires first text information from the storage apparatus 1 in which the first text information representing one or more utterance sentences is stored as the learning data set.

Next, the information processing apparatus 10 performs an identification process to identify a named entity (S2). More specifically, the information processing apparatus 10 identifies one or more named entities included in the first text information acquired in step S1.

Next, the information processing apparatus 10 performs a replacement process to replace the named entity identified in step S2 with an abstract expression (S3). More specifically, the information processing apparatus 10 generates second text information from the first text information by replacing each of one or more named entities identified in step S2 with an abstract expression abstracted based on a predetermined rule. Note that in step S3, after replacing each of the one or more named entities identified in step S2 with the abstract expression abstracted based on the predetermined rule, the information processing apparatus 10 may add a numeral value depending on a context in one or more utterance sentences represented in the first text information thereby generating the second text information from the first text information. Furthermore, in step S3, the information processing apparatus 10 may perform a process such that a named entity, which is included in the one or more named entities identified in step S2 and which is of a facility name indicating a target candidate that may give a solution of the specific task, is replaced with an abstract expression abstracted based on the predetermined rule, and a numeral value corresponding to a rank of an evaluation value about a service provided by a facility indicated by the facility name is added as the numeral value depending on the context.

Next, the information processing apparatus 10 performs a learning process (S4). More specifically, the information processing apparatus 10 learns the model of the dialogue system using, as training data, the second text information generated in step S3.

Note that the process from step S1 to step S3 is performed in a similar manner also for a test data set. In this case, the information processing apparatus 10 may make the model already subjected to the learning perform the process to solve the specific task using, as the test data, the fourth text information generated in the process in step S3 or the like.

Next, the information processing performed by the information processing apparatus 10 is described in further detail below.

Figure 6A:
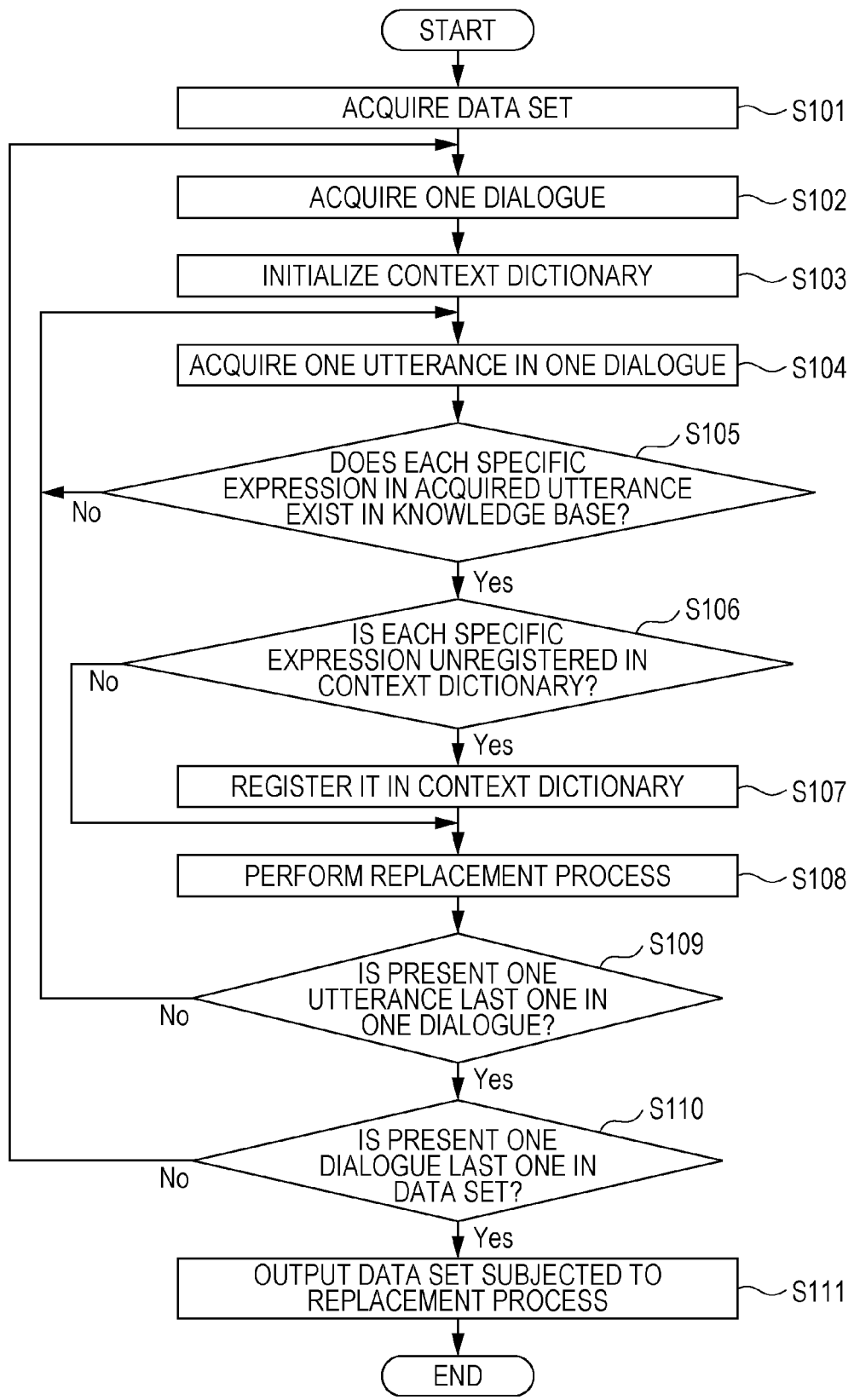
FIG. 6A is a flow chart illustrating a detailed operation of the information processing apparatus according to the embodiment.
Figures 6B, 7, 8:
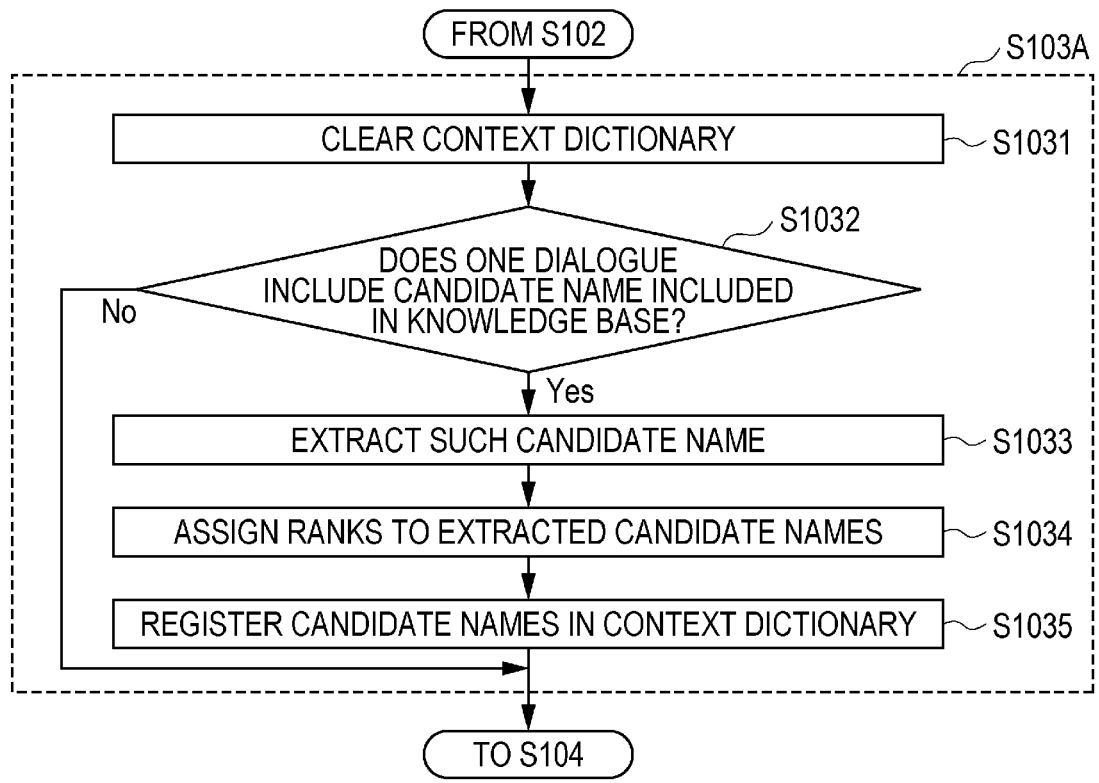
FIG. 6B is a flow chart illustrating another embodiment of a process in step S103 shown in FIG. 6A.
FIG. 7 is a diagram illustrating an example of one dialogue which is not yet subjected to a replacement process according to a first embodiment.
FIG. 8 is a diagram illustrating an example of a context dictionary according to the first embodiment.

FIG. 6A is a flow chart illustrating details of the operation performed by the information processing apparatus 10 according to an embodiment. FIG. 6B is a flow chart illustrating another embodiment of a process in step S103 shown in FIG. 6A. In FIG. 6A, the operation is illustrated in detail for a case where expressions existing in the candidate field shown in FIG. 3 are not included in the replacement source field of the context dictionary 15. On the other hand, the operation shown in FIG. 6B, unlike the operation shown in FIG. 6A, is shown for a case where expressions existing in the candidate field shown in FIG. 3 are included in the replacement source field of the context dictionary 15.

First, as shown in FIG. 6A, the information processing apparatus 10 acquires a data set (S101). The data set may be a learning data set or a test data set. In a case where the data set is a learning data set, the information processing apparatus 10 acquires the learning data set from the storage apparatus 1. On the other hand, in a case where the data set is a test data set, the information processing apparatus 10 acquires the test data set from the storage apparatus 5.

Next, the information processing apparatus 10 acquires one dialogue from the data set acquired in step S101 (S102).

Next, the information processing apparatus 10 initializes the context dictionary 15 (S103). More specifically, the information processing apparatus 10 clears the context dictionary 15 by clearing all expression pairs stored in the context dictionary 15.

Next, the information processing apparatus 10 acquires one utterance from the one dialogue acquired in step S102 (S104).

Next, the information processing apparatus 10 checks whether each named entity included in the one utterance acquired in step S104 exists in the knowledge base 12 (S105). More specifically, the information processing apparatus 10 refers to the knowledge base 12 and checks whether one or more named entities included in the one utterance acquired in step S104 exist in the knowledge base 12.

In a case where the information processing apparatus 10 determines in step S105 that at least one of the one or more named entities included in the one utterance acquired in step S104 exists in the knowledge base 12 (Yes in S105), the process proceeds to step S106. On the other hand, in a case where the information processing apparatus 10 determines in step S105 that any one of the one or more named entities included in the one utterance acquired in step S104 does not exist in the knowledge base 12 (No in S105), the process returns to step S104 in which the information processing apparatus 10 acquires next one utterance from the one dialogue acquired in step S102.

Next, the information processing apparatus 10 checks whether a named entity that is included in the one or more named entities included in the one utterance acquired in step S104 and that exists in the knowledge base 12 is unregistered in the context dictionary 15 (S106).

In a case where the information processing apparatus 10 determines in step S106 that named entities existing in the knowledge base 12 are all registered in the context dictionary 15 (No in S106), the process proceeds to step S108. On the other hand, in a case where the information processing apparatus 10 determines in step S106 that some named entity existing in the knowledge base 12 is unregistered in the context dictionary 15 (Yes in S106), the process proceeds to step S107.

Next, in step S107, the information processing apparatus 10 registers, in the context dictionary 15, the named entity unregistered in the context dictionary 15. More specifically, if there is a named entity that is included in the named entities existing in the knowledge base 12 and that is unregistered in the context dictionary 15, then the information processing apparatus 10 registers, in the context dictionary 15, a pair of the unregistered named entity and a context-dependent expression corresponding to this named entity. More specifically, as shown in FIG. 4, the information processing apparatus 10 registers the named entity in the context dictionary 15 such that the named entity unregistered in the context dictionary 15 is described in the replacement source field and the context-dependent expression paired with the unregistered named entity is described in the replacement destination field. Note that the expression described in the replacement destination field is an abstract expression obtained by abstracting the named entity described in the replacement source field by concept-generalization or the like based on the predetermined rule.

Next, in step S108, the information processing apparatus 10 performs a replacement process such that a named entity that is included in the one or more named entities included in the one utterance acquired in step S104 and that exists in the knowledge base 12 is replaced according to the context dictionary 15. More specifically, the information processing apparatus 10 performs the replacement process such that the named entity included in the one utterance acquired in step S104 is replaced with an abstract expression according to the context dictionary 15 and is furthermore added with a numeral value depending on a context. Note that the numeral value depending on the context is, as described above, assigned in the order in which the one or more named entities occur in the one or more utterance sentences.

Next, the information processing apparatus 10 checks whether the one utterance subjected to the replacement process in step S108 is a last one included in the one piece of dialogue data acquired in step S102 (S109).

In a case where the information processing apparatus 10 determines in step S109 that the one utterance subjected to the replacement process in step S108 is the last one included in the one piece of dialogue data acquired in step S102 (Yes in S109), the process proceeds to step S110. On the other hand, in a case where the information processing apparatus 10 determines in step S109 that the one utterance subjected to the replacement process in step S108 is not the last one included in the one piece of dialogue data acquired in step S102 (No in S109), the process returns to step S104 in which the information processing apparatus 10 acquires next one utterance from the one dialogue acquired in step S102.

Next, in step S110, the information processing apparatus 10 checks whether the one piece of dialogue data acquired in step S102 is a last one in the data set acquired in step S101.

In a case where the information processing apparatus 10 determines in step S110 that the one piece of dialogue data acquired in step S102 is the last one in the data set acquired in step S101 (Yes in S110), the process proceeds to step S111. On the other hand, in a case where the information processing apparatus 10 determines in step S110 that the one piece of dialogue data acquired in step S102 is not the last one in the data set acquired in step S101 (No in S110), the process returns to step S102 in which the information processing apparatus 10 acquires next one piece of dialogue data from the data set acquired in step S101.

In step S111, the information processing apparatus 10 outputs the data set subjected to the replacement process (S111). In a case where the data set is a learning data set, the information processing apparatus 10 stores the learning data set subjected to the replacement process in the storage apparatus 1. On the other hand, in a case where the data set is a test data set, the information processing apparatus 10 stores the test data set subjected to the replacement process in the storage apparatus 5.

Next, referring to FIG. 6B, an operation is described for a case where the replacement source field of the context dictionary 15 includes an expression included in the candidate field shown in FIG. 3. The process shown in FIG. 6B is different from the process shown in FIG. 6A in that the process in step S103 is replaced with step S103A.

More specifically, in step S103A, first, the information processing apparatus 10 clears the context dictionary 15 by clearing all expression pairs stored in the context dictionary 15 (S1031).

Next, the information processing apparatus 10 checks whether a candidate name included in the knowledge base 12 exists in the one dialogue acquired in step S102 (S1032). More specifically, the information processing apparatus 10 refers to the knowledge base 12 and checks whether the one dialogue acquired in step S102 includes a named entity existing in the candidate field of the knowledge base 12. Herein, each named entity existing in the candidate field of the knowledge base 12 is referred to as a candidate name. The information processing apparatus 10 is capable of checking whether there is a named entity existing in the candidate field of the knowledge base 12, by, for example, setting a search condition for the one dialogue acquired in step S102 and searching the knowledge base 12.

In a case where the information processing apparatus 10 determines in step S1032 that a candidate name included in the knowledge base 12 exists in the one dialogue acquired in step S102 (Yes in S1032), the information processing apparatus 10 extracts the candidate name (S1033). In a case where the information processing apparatus 10 determines in step S1032 that a candidate name included in the knowledge base 12 does not exist in the one dialogue acquired in step S102 (No in S1032), the information processing apparatus 10 proceeds to step S104 shown in FIG. 6A to continue the process.

Next, the information processing apparatus 10 ranks the candidate names extracted in step S1033 (S1034). For example, the information processing apparatus 10 ranks the candidate names according to evaluation values in terms of service provided by facilities indicated by the respective candidate names.

Next, the information processing apparatus 10 registers, in the context dictionary 15, the candidate names extracted in step S1033 (S1035). More specifically, the information processing apparatus 10 registers the candidate names extracted in step S1033 in the replacement source field of the context dictionary 15 and registers expressions obtained by adding numeral values to "cand" in the replacement destination field. In the registration operation, the ranks determined in step S1034 are employed as the numeral value.

In the manner described above, the information processing apparatus 10 makes the registration in step S103A such that expressions existing in the candidate field shown in FIG. 3 are registered in the replacement source field of the context dictionary 15.

Next, specific embodiments are described below as to the replacement process in one dialogue in a data set. In first to fourth embodiments, examples are described for a case where any expression existing in the candidate field of the knowledge base 12 is not included in the replacement source field of the context dictionary 15. In fifth to seventh embodiments, examples are described for a case where the replacement source field of the context dictionary 15 includes only expressions existing in the candidate field of the knowledge base 12.

First Embodiment

In the first embodiment described below, it is assumed by way of example that the dialogue system is a task-oriented dialogue system configured to provide a restaurant reservation service. In other words, this restaurant reservation dialogue system is an example of a dialogue system in which the specific task to be solved is a restaurant reservation task.

FIG. 7 is a diagram illustrating an example of one dialogue which is in a state in which a replacement process according to the first embodiment is not yet performed on the one dialogue. FIG. 8 is a diagram illustrating an example of the context dictionary 15 according to the first embodiment. FIG. 9 is a diagram illustrating an example of one dialogue which is in a state in which the one dialogue has been subjected to the replacement process according to the first embodiment.

Note that the one dialogue shown in FIG. 7 may be one dialogue included in the learning data set acquired from the storage apparatus 1 or may be one dialogue included in the test data set acquired from the storage apparatus 5. In FIG. 7 and FIG. 9, a symbol "U:" indicates that an utterance following this symbol is an utterance of a user, while a symbol "S:" indicates that an utterance following this symbol is an utterance of the dialogue system. In the one dialogue shown in FIG. 7, a user utters about a condition of a restaurant. The dialogue system utters a plurality of times until the dialogue system acquires all attributes (slots). When all attributes (slots) are obtained, the dialogue system performs api_call to access, for example, a restaurant DB managed by the dialogue system.

The information processing apparatus 10 refers to the knowledge base 12 shown in FIG. 3 and checks whether a plurality of named entities included in text information representing the one dialogue shown in FIG. 7 exist in the knowledge base 12. The one dialogue shown in FIG. 7 includes named entities relating to the restaurant reservation, such as "business", "cheap", "pads", "french", "british", and the like which exist in the knowledge base 12.

Thus, the information processing apparatus 10 registers these named entities in the replacement source field of the context dictionary 15 as shown in FIG. 8. The information processing apparatus 10 makes a further registration such that abstract expressions "atmosphere_1", "price_1", "location_1", "cuisine_1", and "cuisine_2" corresponding to the respective named entities are registered in the replacement destination field of the context dictionary 15. Note that each of these abstract expressions includes a numeral value added as a suffix assigned in the order in which the abstract expression corresponding to the named entity occurs in the attributed field (slot field) of the knowledge base 12.

Thus, the information processing apparatus 10 is capable of obtaining text information representing one dialogue such as that shown in FIG. 9 by performing the replacement process on the one dialogue sentence shown in FIG. 7 according to the context dictionary 15 shown in FIG. 8. As can be seen from FIG. 9, named entities "business", "cheap", "paris", "french", and "british" are respectively replaced with abstract expressions "atmosphere_1", "price_1", "location_1", "cuisine_1", and "cuisine_2".

According to the present embodiment, the text information representing a one dialogue relating to the restaurant reservation subjected to the replacement process is allowed to be used as training data or a test data set. That is, this provides such training data or the test data in which different entities in abstract expressions belonging to the same concept are distinguished in one dialogue but are not distinguished between different dialogues.

By learning the model of the restaurant reservation system using the training data obtained in the above-described manner, an improvement in the accuracy of the model of the restaurant reservation system generated by the learning is achieved.

Use of the test data set generated in the above-described manner makes it possible for the model of the restaurant reservation system generated by the learning to perform a process to accurately estimate a dialogue action or a dialogue state of an utterance, and accurately estimate a response content to be performed in response to an utterance of a user and output the response.

Second Embodiment

In the second embodiment described below, it is assumed by way of example that the dialogue system is a task-oriented dialogue system configured to provide a hotel reservation service. In other words, this hotel reservation system is an example of a dialogue system in which the specific task to be solved is a hotel reservation task. The following description of the present embodiment focuses differences from the first embodiment.

FIG. 10 is a diagram illustrating an example of one dialogue which is in a state in which a replacement process according to the second embodiment is not yet performed on the one dialogue. FIG. 11 is a diagram illustrating an example of the context dictionary 15 according to the second embodiment. FIG. 12 is a diagram illustrating an example of one dialogue which is in a state in which the one dialogue has been subjected to the replacement process according to the second embodiment.

The information processing apparatus 10 refers to the knowledge base 12 and checks whether a plurality of named entities included in text information representing the one dialogue shown in FIG. 10 exist in the knowledge base 12. As can be seen from FIG. 10, named entities relating to the hotel reservation, such as "vacation", "two", "london", "expensive", "cheap" and the like which exist in the knowledge base 12.

Thus, the information processing apparatus 10 registers these named entities in the replacement source field of the context dictionary 15 as shown in FIG. 11. Furthermore, the information processing apparatus 10 makes a further registration such that abstract expressions "atmosphere_1", "number_1", "location_1", "price_1", "price_2", corresponding to the respective named entities are registered in the replacement destination field of the context dictionary 15. Note that each of these abstract expressions includes a numeral value added as a suffix assigned in the order in which the abstract expression corresponding to the named entity occurs in the attributed field (slot field) of the knowledge base 12.

Thus, the information processing apparatus 10 is capable of obtaining text information representing one dialogue such as that shown in FIG. 12 by performing the replacement process on the one dialogue sentence shown in FIG. 10 according to the context dictionary 15 shown in FIG. 11. As can be seen from FIG. 12, named entities "vacation", "two", "london", "expensive", and "cheap", are respectively replaced with abstract expressions "atmosphere_1", "number_1", "location_1", "price_1", and "price_2".

According to the present embodiment, the text information representing a one dialogue relating to the hotel reservation subjected to the replacement process is allowed to be used as training data or a test data set. That is, this provides such training data or the test data in which different entities in abstract expressions belonging to the same concept are distinguished in one dialogue but are not distinguished between different dialogues.

Thus, an improvement in the accuracy of the model of the hotel reservation system generated by the learning is achieved. Furthermore, it becomes possible for the model of the hotel reservation system generated by the learning to perform a process to accurately estimate a dialogue action or a dialogue state of an utterance and accurately estimate or output a response content to an utterance of a user.

Third Embodiment

In the second embodiment described below, it is assumed by way of example that the dialogue system is a task-oriented dialogue system configured to provide a burger order service. In other words, the burger order system is an example of a dialogue system in which the specific task to be solved is a burger order task. The following description of the present embodiment focuses differences from the previous embodiments described above.

FIG. 13 is a diagram illustrating an example of one dialogue which is in a state in which a replacement process according to the third embodiment is not yet performed on the one dialogue. FIG. 14 is a diagram illustrating an example of the context dictionary 15 according to the third embodiment. FIG. 15 is a diagram illustrating an example of one dialogue which is in a state in which the one dialogue has been subjected to the replacement process according to the third embodiment.

The information processing apparatus 10 refers to the knowledge base 12 and checks whether a plurality of named entities included in text information representing the one dialogue shown in FIG. 13 exist in the knowledge base 12. The one dialogue shown in FIG. 13 includes named entities relating to the burger order, such as "chicken", "onion", "mustard", "wheat", "cheese", and the like which exist in the knowledge base 12.

Thus, the information processing apparatus 10 registers these named entities in the replacement source field of the context dictionary 15 as shown in FIG. 14. The information processing apparatus 10 makes a further registration such that abstract expressions "main_1", "vagetable_1", "sauce_1", "bun_1", "bun_2" corresponding to the respective named entities are registered in the replacement destination field of the context dictionary 15. Note that each of these abstract expressions includes a numeral value added as a suffix assigned in the order in which the abstract expression corresponding to a named entity occurs in the attributed field (slot field) of the knowledge base 12.

Thus, the information processing apparatus 10 is capable of obtaining text information representing one dialogue such as that shown in FIG. 15 by performing the replacement process on the one dialogue sentence shown in FIG. 13 according to the context dictionary 15 shown in FIG. 14. As can be seen from FIG. 15, named entities "chicken", "onion", "mustard", "wheat", and "cheese" are respectively replaced with abstract expressions "main_1", "vagetable_1", "sauce_1", "bun_1", and "bun_2".

According to the present embodiment, the text information representing a one dialogue relating to the burger order subjected to the replacement process is allowed to be used as training data or a test data set. That is, this provides such training data or the test data in which different entities in abstract expressions belonging to the same concept are distinguished in one dialogue but are not distinguished between different dialogues.

Thus, an improvement in the accuracy of the model of the burger order system generated by the learning is achieved. Furthermore, it becomes possible for the model of the burger order system generated by the learning to perform a process to accurately estimate a dialogue action or a dialogue state of an utterance and accurately estimate or output a response content in response to an utterance of a user.

Fourth Embodiment

In the second embodiment described below, it is assumed by way of example that the dialogue system is a task-oriented dialogue system configured to provide a rent apartment search service. In other words, the rent apartment search system is an example of a dialogue system in which the specific task to be solved is a rent apartment search task. The following description of the present embodiment focuses differences from the previous embodiments described above.

FIG. 16 is a diagram illustrating an example of one dialogue which is in a state in which a replacement process according to the fourth embodiment is not yet performed on the one dialogue. FIG. 17 is a diagram illustrating an example of the context dictionary 15 according to the fourth embodiment. FIG. 18 is a diagram illustrating an example of one dialogue which is in a state in which the one dialogue has been subjected to the replacement process according to the fourth embodiment.

The information processing apparatus 10 refers to the knowledge base 12 and checks whether a plurality of named entities included in text information representing the one dialogue shown in FIG. 16 exist in the knowledge base 12. The one dialogue shown in FIG. 16 includes named entities relating to the rent apartment search, "three", "new", "cheap", "setagaya", "shinjuku" and the like which exist in the knowledge base 12.

Thus, the information processing apparatus 10 registers these named entities in the replacement source field of the context dictionary 15 as shown in FIG. 17. The information processing apparatus 10 makes a further registration such that abstract expressions "number_1", "age_1", "price_1", "location_1", "location_2" corresponding to the respective named entities are registered in the replacement destination field of the context dictionary 15. Note that each of these abstract expressions includes a numeral value added as a suffix assigned in the order in which the abstract expression corresponding to named entity occurs in the attributed field (slot field) of the knowledge base 12.

Thus, the information processing apparatus 10 is capable of obtaining text information representing one dialogue such as that shown in FIG. 18 by performing the replacement process on the one dialogue sentence shown in FIG. 16 according to the context dictionary 15 shown in FIG. 17. As can be seen from FIG. 18, named entities "three", "new", "cheap", "setagaya", and "shinjuku" are respectively replaced with abstract expressions "number_1", "age_1", "price_1", "location_1", and "location_2".

According to the present embodiment, the text information representing a one dialogue relating to the rent apartment search subjected to the replacement process is allowed to be used as training data or a test data set. That is, this provides such training data or the test data in which different entities in abstract expressions belonging to the same concept are distinguished in one dialogue but are not distinguished between different dialogues.

Thus, an improvement in the accuracy of the model of the rent apartment search system generated by the learning is achieved. Furthermore, it becomes possible for the model of the rent apartment search system generated by the learning to perform a process to accurately estimate a dialogue action or a dialogue state of an utterance and accurately estimate or output a response content in response to an utterance of a user.

Fifth Embodiment

In the fifth embodiment described below, it is assumed by way of example that the dialogue system is a task-oriented dialogue system configured to provide a restaurant reservation service.

FIG. 19 is a diagram illustrating an example of one dialogue which is in a state in which a replacement process according to the fifth embodiment is not yet performed on the one dialogue. FIG. 20 is a diagram illustrating a part of a knowledge base 12 according to the fifth embodiment. FIG. 21 is a diagram illustrating an example of the context dictionary 15 according to the fifth embodiment. FIG. 22 is a diagram illustrating an example of one dialogue which is in a state in which the one dialogue has been subjected to the replacement process according to the fifth embodiment.

Note that the one dialogue shown in FIG. 19 may be one dialogue included in the learning data set acquired from the storage apparatus 1 or may be one dialogue included in the test data set acquired from the storage apparatus 5. In FIG. 19 and FIG. 22, a symbol "U:" indicates that an utterance following this symbol is an utterance of a user, while a symbol "S:" indicates that an utterance following this symbol is an utterance of the dialogue system. In the one dialogue shown in FIG. 19, the dialogue system gives utterances to propose to a user restaurant candidates in the order of evaluation from the highest to the lowest until the user accepts one of the proposed restaurant candidates.

The information processing apparatus 10 refers to the knowledge base 12 shown in FIG. 20 and checks whether candidate names described in the knowledge base 12 exist in the text information representing the one dialogue shown in FIG. 19. Note that the candidate names described in the knowledge base 12 are facility names indicating target candidates that may solve the specific task, which is the restaurant reservation in this case, and the facility names are named entities indicating restaurant names. The candidate names in the knowledge base 12 correspond to named entities existing in the candidate field of the knowledge base 12 shown in FIG. 3. The one dialogue shown in FIG. 19 includes named entities representing restaurant names, such as "the_sparkling_service", "gentle_deep_water", and the like which exist in the knowledge base 12 shown in FIG. 20.

Thus, the information processing apparatus 10 registers these named entities representing these restaurant names in the replacement source field of the context dictionary 15 as shown in FIG. 21. The information processing apparatus 10 makes a further registration such that abstract expressions "cand_1" and "cand_2" corresponding to the respective named entities representing the restaurant names are registered in the replacement destination field of the context dictionary 15. Note that each of these abstract expressions includes a numeral value added as a suffix assigned in the descending order of the evaluation values for the named entities indicating the restaurant names.

In the knowledge base 12 shown in FIG. 20, "40" is stored as a value (that is, a content) of the attribute (slot) of "r_rating" corresponding to "the_sparkling_service". On the other hand, "32" is stored as a value (that is, a content) of the attribute (slot) of "r_rating" corresponding to the "gentle_deep_water". Thus the evaluation value for "the_sparkling_service" is hither than the evaluation value for "gentle_deep_water". Thus, in the context dictionary 15, "cand_1" is registered as the abstract expression corresponding to "the_sparkling_service", while "cand_2" is registered as the abstract expression corresponding to "gentle_deep_water".

Thus, the information processing apparatus 10 is capable of obtaining text information representing one dialogue such as that shown in FIG. 22 by performing the replacement process on the one dialogue sentence shown in FIG. 19 according to the context dictionary 15 shown in FIG. 21. As can be seen from FIG. 22, named entities "the_sparkling_service", and "gentle_deep_water" are respectively replaced with abstract expressions "cand_1", and "cand_2".

According to the present embodiment, the text information representing a one dialogue relating to the restaurant reservation subjected to the replacement process is allowed to be used as training data or a test data set. That is, this provides such training data or the test data in which different entities in abstract expressions belonging to the same concept are distinguished in one dialogue but are not distinguished between different dialogues.

By learning the model of the restaurant reservation system using the training data obtained in the above-described manner, an improvement in the accuracy of the model of the restaurant reservation system generated by the learning is achieved.

Use of the test data set generated in the above-described manner makes it possible for the model of the restaurant reservation system generated by the learning to perform a process to accurately estimate a dialogue action or a dialogue state of an utterance and accurately estimate or output a response content to an utterance of a user.

Sixth Embodiment

In the sixth embodiment described below, it is assumed by way of example that the dialogue system is a task-oriented dialogue system configured to provide a hotel reservation service. The following description of the present embodiment focuses differences from the fifth embodiment.

FIG. 23 is a diagram illustrating an example of one dialogue which is in a state in which a replacement process according to the sixth embodiment is not yet performed on the one dialogue. FIG. 24 is a diagram illustrating a part of a knowledge base 12 according to the sixth embodiment. FIG. 25 is a diagram illustrating an example of the context dictionary 15 according to the sixth embodiment. FIG. 26 is a diagram illustrating an example of one dialogue which is in a state in which the one dialogue has been subjected to the replacement process according to the sixth embodiment.

The information processing apparatus 10 refers to the knowledge base 12 shown in FIG. 24 and checks whether candidate names described in the knowledge base 12 exist in the text information representing the one dialogue shown in FIG. 23. Note that the candidate names described in the knowledge base 12 are facility names indicating target candidates that may solve the specific task, which is the hotel reservation in this case, and the facility names are named entities indicating hotel names. The one dialogue shown in FIG. 23 includes named entities representing hotel names, such as "green_dog_garden", "deep_wolf_hill", and the like which exist in the knowledge base 12 shown n FIG. 24.

Thus, the information processing apparatus 10 registers these named entities representing these hotel names in the replacement source field of the context dictionary 15 as shown in FIG. 25. The information processing apparatus 10 makes a further registration such that abstract expressions "cand_1" and "cand_2" corresponding to the respective named entities representing the hotel names are registered in the replacement destination field of the context dictionary 15. Note that each of these abstract expressions includes a numeral value added as a suffix assigned in the descending order of the evaluation value for the named entity indicating the hotel name.

In the knowledge base 12 shown in FIG. 24, "55" is stored as a value of "r_rating" corresponding to "green_dog_garden", while "34" is stored as a value of "r_rating" corresponding to "deep_wolf_hill". Thus, the evaluation value for "green_dog_garden" is higher than the evaluation value for "deep_wolf_hill". Thus, in the context dictionary 15, "cand_1" is registered as the abstract expression corresponding to "green_dog_garden", while "cand_2" is registered as the abstract expression corresponding to "deep_wolf_hill".

Thus, the information processing apparatus 10 is capable of obtaining text information representing one dialogue such as that shown in FIG. 26 by performing the replacement process on the one dialogue sentence shown in FIG. 23 according to the context dictionary 15 shown in FIG. 25. As can be seen from FIG. 26, named entities "green_dog_garden", and "deep_wolf_hill" are respectively replaced with abstract expressions "cand_1", and "cand_2".

According to the present embodiment, the text information representing a one dialogue relating to the hotel reservation subjected to the replacement process is allowed to be used as training data or a test data set. That is, this provides such training data or the test data in which different entities in abstract expressions belonging to the same concept are distinguished in one dialogue but are not distinguished between different dialogues.

Thus, an improvement in the accuracy of the model of the hotel reservation system generated by the learning is achieved. Furthermore, it becomes possible for the model of the hotel reservation system generated via the learning to accurately estimate a dialogue action or a dialogue state of an utterance and estimate and output a content in response to the utterance of a user.

Seventh Embodiment

In the seventh embodiment described below, it is assumed by way of example that the dialogue system is a task-oriented dialogue system configured to provide a rent apartment search service. The following description of the present embodiment focuses differences from the fifth embodiment and other embodiments.

FIG. 27 is a diagram illustrating an example of one dialogue which is in a state in which a replacement process according to the seventh embodiment is not yet performed on the one dialogue. FIG. 28 is a diagram illustrating a part of a knowledge base 12 according to the seventh embodiment. FIG. 29 is a diagram illustrating an example of the context dictionary 15 according to the seventh embodiment. FIG. 30 is a diagram illustrating an example of one dialogue which is in a state in which the one dialogue has been subjected to the replacement process according to the seventh embodiment.

The information processing apparatus 10 refers to the knowledge base 12 shown in FIG. 28 and checks whether candidate names described in the knowledge base 12 exist in the text information representing the one dialogue shown in FIG. 27. Note that the candidate names described in the knowledge base 12 are facility names indicating target candidates that may solve the specific task, which is the rent apartment search in this case, and the facility names are named entities indicating names of buildings including rent apartments. The one dialogue shown in FIG. 27 includes named entities representing name of a building including a rent apartments, such as "grand_union_forest", "water_colorful_tree", and the like which exist in the knowledge base 12 shown in FIG. 28.

Thus, the information processing apparatus 10 registers these named entities representing these building names in the replacement source field of the context dictionary 15 as shown in FIG. 29. The information processing apparatus 10 makes a further registration such that abstract expressions "cand_1" and "cand_2" corresponding to the respective named entities representing the building names are registered in the replacement destination field of the context dictionary 15. Note that each of these abstract expressions includes a numeral value added as a suffix assigned in the descending order of the evaluation value for the named entity indicating the building.

In the knowledge base 12 shown in FIG. 28, "0.8" is stored as a value of "r_distance" corresponding to "grand_union_forest", while "1.2" is stored as a value of "r_distance" corresponding to "water_colorful_tree". Thus, the building including the rent apartment indicated by "grand_union_forest" is closer than the building including the rent apartment indicated by "water_colorful_tree", and thus the former has a higher evaluation value. Thus, in the context dictionary 15, "cand_1" is registered as the abstract expression corresponding to "grand_union_forest", while "cand_2" is registered as the abstract expression corresponding to "water_colorful_tree".

Thus, the information processing apparatus 10 is capable of obtaining text information representing one dialogue such as that shown in FIG. 30 by performing the replacement process on the one dialogue sentence shown in FIG. 27 according to the context dictionary 15 shown in FIG. 25. As can be seen from FIG. 30, named entities "grand_union_forest" and "water_colorful_tree" are respectively replaced with abstract expressions "cand_1" and "cand_2".

According to the present embodiment, the text information representing a one dialogue relating to the rent apartment search subjected to the replacement process is allowed to be used as training data or a test data set. That is, this provides such training data or the test data in which different entities in abstract expressions belonging to the same concept are distinguished in one dialogue but are not distinguished between different dialogues.

Thus, an improvement in the accuracy of the model of the rent apartment search system generated by the learning is achieved. Furthermore, it becomes possible for the model of the rent apartment search system generated by the learning to perform a process to accurately estimate a dialogue action or a dialogue state of an utterance and accurately estimate or output a response content in response to an utterance of a user.

Effects and Related Issues

As described above, according to embodiments, it is possible to learn the model of the dialogue system using training data obtained by replacing named entities included in utterance sentences with abstract expressions in which variations of named entities are eliminated based on the predetermined rule. Thus, in the information processing method and the information processing apparatus, an improvement in the accuracy of the model of the dialogue system generated by the learning is achieved.

Note that in a case where an utterance sentence includes named entities which will fall within the same concept when they are abstracted, different entities belonging to the same concept are regarded as identical to each other between different dialogues, but they cannot be distinguished from each other in one dialogue. This may cause a reduction in accuracy of the model of the dialogue system generated via learning.

To handle the above situation, numeral values depending on the context may be added to the abstract expressions obtained by the replacement based on the predetermined rule. That is, according to the present embodiment, in addition to replacing named entities included in utterance sentence with abstract expressions, numeral values depending on a context may be added to the abstract expressions. This makes it possible to provide training data in which different entities in abstract expressions belonging to the same concept are distinguished in one dialogue but they are regarded as identical to each other between different dialogues, and thus a further improvement in the accuracy of the model of the dialogue system generated by the learning is achieved.

According to the present embodiment, training data obtained by replacing named entities included in an utterance sentence with abstract expressions may be further subjected to a bigram process or a standardization process as preprocessing, and then a dialogue system model may be learned. This allows it to achieve a further improvement in the accuracy of the model of the dialogue system generated by the learning.

According to the present embodiment, similarly, a test data set may be used which is obtained by replacing named entities included in an utterance sentence with abstract expressions in which variations of named entities are eliminated. This makes it possible for the model of the dialogue system generated by the learning to perform a process to accurately estimate a dialogue action or a dialogue state of an utterance and accurately estimate or output a response content that is to be performed by the dialogue system in response to an utterance of a user.

According to the present embodiment, test data obtained by replacing named entities included in an utterance sentence with abstract expressions may be further subjected to a bigram process or a standardization process as preprocessing, and then a result may be processed by a dialogue system model generated via learning. This makes it possible for the model of the dialogue system generated by the learning to perform a process to more accurately estimate a dialogue action or a dialogue state of an utterance and more accurately estimate or output a response content that is to be performed by the dialogue system in response to an utterance of a user.

Experimental Results

A dialogue system model was obtained via learning using a learning data set obtained by performing a replacement process using an information processing apparatus according to an information processing method of the present disclosure, and effectiveness was evaluated for a case where the dialogue system estimated a response content to be output by the dialogue system. Experimental results were as follows.

Experimental Conditions

In an experiment, End-to-End Memory Networks disclosed in Sukhbaatar, S., Szlam, A., Weston, J., and Fergus, R. "End-to-end memory networks", Proceedings of NIPS, R, (2015) were used in a dialogue system model such as a restaurant reservation system. Learning was performed under a condition in which a learning rate, an epoch, the number of hops, and Embedding Dim were respectively set to 0.01, 200, 2, and 32, and the other parameters were set to values described in Sukhbaatar, S., Szlam, A., Weston, J., and Fergus, R. "End-to-end memory networks", Proceedings of NIPS, R, (2015). In the knowledge base 12, cuisines, locations, price zones, the number of people for reservation, feelings, restriction handling, addresses, and phone numbers were stored via learning.

Two types test data sets, that is, a data set for test #1 and a data set for test #2 each including 1000 pieces of data were prepared. The data set for test #1 and the data set for test #2 each include an utterance of a user and a plurality of utterances selectable by the dialogue system in response to the utterance. When the dialogue system selected an utterance to be selected in response to an utterance of a user according to the dialogue system model, it was evaluated that the selection was correct.

For example, in a case where one dialogue includes six utterances as in the example shown in FIG. 7, the data set for test #1 and the data set for test #2 each include five utterances except for the last 6th utterance, and include an utterance to be the 6th utterance as a choice. In a case where the dialogue system selected the 6th utterance in the one dialogue shown in FIG. 7, it was evaluated that the correct selection was made by the performance of the dialogue system. More specifically, the performance of the dialogue system model was given by the ratio of corrected selections made by the dialogue system model for utterances of a user with respect to the total number (1000 in this specific example) of pieces of data included in each of the data set for test #1 and the data set for test #2.

Note that the data set for test #1 and the data set for test #2 were different from each other in terms of the cuisine and the location. Another difference was in that the data set for test #2 included unknown words. In this experiment, the learning was performed using the data set for test #1.

Experimental Results

FIGS. 31 to 33 illustrates effects of the replacement process according to the present disclosure. In each of FIGS. 31 to 33, "Original" indicates experimental results, in a comparative example, obtained for a case where the model used was obtained via the learning without performing the replacement process according to the present disclosure.

First Experimental Result

FIG. 31 shows a first experimental result for a case where a task similar to the task for the one dialogue shown in the first embodiment was performed. In the task of this experiment, a user uttered about a condition as to a restaurant, and the dialogue system made utterances until all attributes (slots) were acquired from the user. When all attributes (slots) were acquired, the dialogue system performed api_call to perform a task to access, for example, a restaurant DB managed by the dialogue system.

In FIG. 31, "+replacement" shows performances obtained respectively using the data set for test #1 and the data set for test #2 subjected to the replacement such that named entities were replaced with abstract expressions and numeral values were added thereto in accordance with the order occurrence in the dialogue. In FIG. 31, "+replacement, bi-gram, removing candidate" shows performances obtained when the bigram process was further performed as the preprocessing, and furthermore the number of selectable utterance sentences in each of the data set for test #1 and the data set for test #2 was reduced by deleting utterance sentences having low relevance to a correct utterance sentence from the selectable utterances.

As can be seen from FIG. 31, "+replacement" showed higher performances than "Original". In the case where the data set for test #2 including unknown words was used, the result showed high performance similar to that obtained for the data set for test #1 including no unknown words. From these results, it can be seen that the replacement process according to the present disclosure made it possible for the dialogue system model generated via learning to accurately estimate correct responses to utterances of the user.

From FIG. 31, it also can be seen that "+replacement, bi-gram, removing candidate" showed higher performances than "+replacement" for both the data set for test #1 and the data set for test #2. This result indicates that performing the preprocessing in addition to the replacement process according to the present disclosure made it possible for the dialogue system model generated via learning to more accurately estimate correct responses to utterances of the user.

Second Experimental Result

FIG. 32 shows a second experimental result for a case where a task similar to the task for the one dialogue shown in the fifth embodiment was performed. In the task of this experiment, the dialogue system performs the task to utter to propose restaurant candidates in the descending order of the evaluation values until the user accepts one of the proposed restaurant candidates.

In FIG. 32, "+replacement" shows performances obtained respectively using the data set for test #1 and the data set for test #2 subjected to the replacement such that named entities indicating restaurant names were replaced with abstract expressions and numeral values were added thereto in the descending order of the evaluation values corresponding to the named entities. In FIG. 32, "+replacement, normalize" shows performances obtained respectively using the data set for test #1 and the data set for test #2 further subjected to the standardization process as the preprocessing.

As can be seen from FIG. 32, "+replacement" showed higher performances than "Original". In the case where the data set for test #2 including unknown words was used, the result showed high performance equal to or higher than that obtained for the data set for test #1 including no unknown words. It can also be seen that "+replacement, normalize" showed higher performances than "+replacement". From these results, it can be seen that the replacement process according to the present disclosure made it possible for the dialogue system model generated via learning to accurately estimate correct responses to utterances of the user.

Third Experimental Result

FIG. 33 shows a third experimental result for a case where the dialogue system performed a task to utter to present information about a phone number, an address, and the like of a restaurant accepted by a user. In FIG. 33, "+replacement" and "+replacement, normalize" showed similar results to those shown in FIG. 32, and thus a further description thereof is omitted.

In FIG. 33, like FIG. 32, "+replacement" showed higher performances than "Original". Also in the case where the data set for test #2 including unknown words was used, the result showed high performance similar to or higher than the result for the data set for test #1 including no unknown words. It also can be seen that "+replacement, normalize" showed higher performances than "+replacement". These results also show that the replacement process according to the present disclosure made it possible for the dialogue system model generated via learning to accurately estimate correct responses to utterances of the user.

The information processing apparatus, the information processing method, and related techniques have been described above with reference to the specific embodiments. However, the information processing apparatus, the information processing method, and related techniques according to the present disclosure are not limited to these embodiments.

Each of the processing units in the information processing apparatus according to any one of the embodiments described above may be typically implemented by an integrated circuit such as an LSI. The LSI may be individually formed as chips, or one chip may be formed so as to include a part or all of the processing units.

However, the technique of implementing an integrated circuit is not limited to the LSI and may be realized by using a dedicated circuit or a general-purpose processor. An FPGA (Field Programmable Gate Array) that can be programmed after the manufacture of the LSI or a reconfigurable processor in which the connections and the settings of circuit cells disposed inside the LSI can be reconfigured may be used.

Note that the present disclosure may also be implemented as an information processing method executed by an information processing apparatus.

In each embodiment described above, each constituent element may be realized using dedicated hardware or may be realized by executing software program corresponding to the constituent element. Each constituent element may be realized by a program execution unit such as a CPU, a process or the like by reading software program stored in a storage medium such a hard disk, a semiconductor memory, or the like and executing the software program.

Note that the manners of dividing the meaning generation apparatus into functional blocks shown in block diagrams are merely examples. A plurality of functional blocks may be combined together into one functional block, or one functional block may be divided into a plurality of functional block. A part of function may be transferred to another functional block. Functions of a plurality of functional blocks having similar functions may be executed by single hardware or may be executed by software in parallel or in a time-sharing manner.

The orders of executing the steps described in flow charts are merely examples that may be employed to realize the present disclosure, and the order may be different from those employed in these examples. Part of the steps may be performed concurrently (in parallel) with other steps.

The information processing apparatus according to one or more embodiments has been described above. Note that the present disclosure is not limited to the embodiments described above. It will be apparent to those skilled in the art that many various modifications may be applicable to the embodiments without departing from the spirit and scope of the present disclosure. Furthermore, constituent elements of different embodiments may be combined. In this case, any resultant combination also falls within the scope of the present disclosure.

The present disclosure is usable in an information processing method, an information processing apparatus, and a program, and more particularly, the present disclosure is usable in an information processing method, an information processing apparatus, and a program applied to a task-oriented dialogue system such as a restaurant reservation system, a hotel reservation system, a rent apartment search system, and the like.

What is claimed is:

1. An information processing method comprising:
   acquiring, by a processor, first text information from a storage apparatus in which the first text information representing one or more utterance sentences is stored as a learning data set;
   identifying, by the processor, one or more named entities included in the acquired first text information;
   replacing, by the processor, each of the one or more identified named entities with an abstract expression abstracted based on a predetermined rule thereby generating second text information from the first text information;
   learning, by the processor, a model of a dialogue system using, as training data, the second text information generated in the replacing; and
   performing, by the processor, a process to solve a specific task using the model learned in the learning,
   wherein
   in the acquiring, third text information is acquired from a storage apparatus in which the third text information representing one or more utterance sentences is stored as a test data set,
   in the identifying, one or more named entities included in the acquired third text information are identified,
   in the replacing, each of the one or more identified named entities included in the third text information is replaced with an abstract expression abstracted based on the predetermined rule thereby generating fourth text information from the third text information,
   in the performing the process, the process to solve the specific task is performed using, as a test data set, the fourth text information generated in the replacing,
   the method further comprises performing preprocessing in which a standardization process is performed as the preprocessing to standardize a format of the expressions included in the second text information and the fourth text information generated in the replacing,
   in the learning, the model is learned using, as training data, the second text information subjected to the standardization process in the preprocessing, and
   in the performing the process, the process of solving the specific task is performed using, as a test data set, the fourth text information subjected to the standardization process in the preprocessing.

2. The information processing method according to claim 1, wherein, in the replacing, in addition to the replacing of each of the one or more identified named entities with the abstract expression abstracted based on the predetermined rule, a numeral value is added depending on a context in one or more utterance sentences represented in the first text information thereby generating the second text information from the first text information.

3. The information processing method according to claim 2, wherein the numeral value depending on the context is a numeral value depending on an order in which the one or more named entities occur in the one or more utterance sentences represented in the first text information.

4. The information processing method according to claim 1, further comprising performing, by the processor, preprocessing in which a bigram process is performed as the preprocessing to divide the second text information and the fourth text information generated in the replacing into a plurality of segments each including two adjacent expressions, wherein in the learning, the model is learned using, as training data, the second text information subjected to the bigram process in the preprocessing, and in the performing the process, a process is performed to solve the specific task using, as a test data set, the fourth text information subjected to the bigram process in the preprocessing.

5. The information processing method according to claim 1, further comprising performing, by the processor, outputting such that one or more abstract expressions, included in a result of the performed process to solve the specific task and replaced based on the predetermined rule, are replaced with original named entities and output.

6. A non-transitory storage medium storing a program that causes a computer to execute the information processing method according to claim 1.

7. An information processing method comprising:

acquiring, by a processor, first text information from a storage apparatus in which the first text information representing one or more utterance sentences is stored as a learning data set;

identifying, by the processor, one or more named entities included in the acquired first text information;

replacing, by the processor, each of the one or more identified named entities with an abstract expression abstracted based on a predetermined rule thereby generating second text information from the first text information;

learning, by the processor, a model of a dialogue system using, as training data, the second text information generated in the replacing; and performing, by the processor, a process to solve a specific task using the model learned in the learning, wherein, in the replacing, in addition to the replacing of each of the one or more identified named entities with the abstract expression abstracted based on the predetermined rule, a numeral value is added depending on a context in one or more utterance sentences represented in the first text information thereby generating the second text information from the first text information, in the replacing, a named entity, which is included in the one or more identified named entities and which is of a facility name indicating a target candidate that give a solution of a specific task, is replaced with an abstract expression abstracted based on the predetermined rule, and a numeral value corresponding to a rank of an evaluation value about a service provided by a facility indicated by the facility name is added as the numeral value depending on the context, in the acquiring, third text information is acquired from a storage apparatus in which the third text information representing one or more utterance sentences is stored as a test data set, in the identifying, one or more named entities included in the acquired third text information are identified, in the replacing, each of the one or more identified named entities included in the third text information is replaced with an abstract expression abstracted based on the predetermined rule thereby generating fourth text information from the third text information, in the performing the process, the process to solve the specific task is performed using, as a test data set, the fourth text information generated in the replacing, the method further comprises performing preprocessing in which a standardization process is performed as the preprocessing to standardize a format of the expressions included in the second text information and the fourth text information generated in the replacing, in the learning, the model is learned using, as training data, the second text information subjected to the standardization process in the preprocessing, and in the performing the process, the process of solving the specific task is performed using, as a test data set, the fourth text information subjected to the standardization process in the preprocessing.

8. An information processing apparatus comprising:

a processor that acquires first text information from a storage apparatus in which first text information representing one or more utterance sentences is stored as a learning data set;

identifies one or more named entities included in the acquired first text information;

replaces each of the one or more named entities identified by the identifier with an abstract expression abstracted based on a predetermined rule thereby generating second text information from the first text information;

learns a model of a dialogue system using, as training data, the second text information; and performs a process to solve a specific task using the model learned in the learning, wherein in the acquiring, third text information is acquired from a storage apparatus in which the third text information representing one or more utterance sentences is stored as a test data set, in the identifying, one or more named entities included in the acquired third text information are identified, in the replacing, each of the one or more identified named entities included in the third text information is replaced with an abstract expression abstracted based on the predetermined rule thereby generating fourth text information from the third text information, in the performing the process, the process to solve the specific task is performed using, as a test data set, the fourth text information generated in the replacing, the processor further performs preprocessing in which a standardization process is performed as the preprocessing to standardize a format of the expressions included in the second text information and the fourth text information generated in the replacing, in the learning, the model is learned using, as training data, the second text information subjected to the standardization process in the preprocessing, and in the performing the process, the process of solving the specific task is performed using, as a test data set, the fourth text information subjected to the standardization process in the preprocessing.

* * * * *